US008531522B2

(12) United States Patent
Horovitz et al.

(10) Patent No.: US 8,531,522 B2
(45) Date of Patent: Sep. 10, 2013

(54) SYSTEMS AND METHODS FOR VIDEO MONITORING USING LINKED DEVICES

(75) Inventors: Itsik Horovitz, Holon (IL); Shmuel Kiro, Rehovot (IL); Or Sheffet, Ramat Gan (IL)

(73) Assignee: Verint Systems Ltd., Herzilya Pituach (IL)

( * ) Notice: Subject to any disclaimer, the term of this patent is extended or adjusted under 35 U.S.C. 154(b) by 1033 days.

(21) Appl. No.: 12/245,781

(22) Filed: Oct. 6, 2008

(65) Prior Publication Data

US 2009/0295918 A1 Dec. 3, 2009

Related U.S. Application Data

(60) Provisional application No. 61/057,555, filed on May 30, 2008.

(51) Int. Cl.
*H04N 7/18* (2006.01)

(52) U.S. Cl.
USPC .......................... 348/143; 348/152; 348/159

(58) Field of Classification Search
USPC ........................................................ 348/143
See application file for complete search history.

(56) References Cited

U.S. PATENT DOCUMENTS

| | | |
|---|---|---|
| 4,992,866 A | 2/1991 | Morgan |
| 6,002,995 A | 12/1999 | Suzuki et al. |
| 7,319,479 B1 | 1/2008 | Crabtree et al. |
| 7,777,783 B1 | 8/2010 | Chin et al. |
| 7,859,571 B1 * | 12/2010 | Brown et al. ............... 348/211.3 |
| 2005/0163345 A1 | 7/2005 | van den Bergen et al. |
| 2008/0088706 A1 * | 4/2008 | Girgensohn et al. ...... 348/207.99 |

FOREIGN PATENT DOCUMENTS

| | | |
|---|---|---|
| GB | 2424784 | 10/2006 |
| WO | 9935850 A1 | 7/1999 |
| WO | 0113637 A1 | 2/2001 |
| WO | 03051059 | 6/2003 |
| WO | 2005027068 | 10/2006 |
| WO | 2007094802 A2 | 8/2007 |

OTHER PUBLICATIONS

Canadian Office Action, dated Mar. 23, 2011, received from the Canadian Intellectual Property Office in connection with Canadian Application No. 2,665,959.

* cited by examiner

*Primary Examiner* — Douglas Blair
*Assistant Examiner* — Angela Nguyen
(74) *Attorney, Agent, or Firm* — Andrus, Sceales, Starke & Sawall, LLP

(57) ABSTRACT

A subject can be tracking using a plurality of physical video monitoring or image acquisition devices deployed in a delimited area. A map represents the delimited area. Icons representing the physical monitoring devices can be placed and configured on the map representing the delimited area. Some or all of the placed and configured video monitoring devices can be logically linked together to form scenes. The video feed from the physical video monitoring devices may be recorded in stable storage. A layout for display of the video feeds may be selected. Upon playing the video feed, whether live or recorded, a subject can be tracked through the delimited area by selecting one of the video monitoring devices in one of the available scenes.

14 Claims, 10 Drawing Sheets

| 217 | 217 | 217 | 217 |
|-----|-----|-----|-----|
| 217 |   215   || 217 |
| 217 |         || 217 |
| 217 | 217 | 217 | 217 |

FIG. 4c

SYSTEMS AND METHODS FOR VIDEO MONITORING USING LINKED DEVICES

CROSS-REFERENCE TO RELATED APPLICATION

The present disclosure claims priority to U.S. patent application Ser. No. 61/057,555, filed on May 30, 2008, entitled "Video Monitoring Using Linked Devices," which is incorporated herein by referenced in it entirety.

TECHNICAL FIELD

The present disclosure is generally related to video monitoring, and more particularly, is related to video monitoring using a number of logically connected or linked video monitoring devices so that a subject can be tracked through a delimited area.

BACKGROUND

Certain delimited areas such as airports and company campuses may evoke security concerns resulting in a need to monitor the area. The word "surveillance" is commonly used to describe observation from a distance by means of electronic equipment or other technological means. The term is used for all forms of observation or monitoring, often involving the use of closed-circuit television cameras.

Accordingly, areas to be monitored may be equipped with image acquisition equipment, such as video cameras or other video monitoring devices that are configured for live or after-the-fact monitoring of sensitive areas. The video feed may be routed to a control center where the video is monitored in real time by people such as security experts, or the video feed may be recorded to be viewed later. Command and control equipment may include one or more video monitoring displays that are coupled to video cameras distributed throughout the delimited area.

SUMMARY

A subject can be tracked using a plurality of physical video monitoring or image acquisition devices deployed in a delimited area. A map represents the delimited area. Icons representing the physical monitoring devices can be placed and configured on the map representing the delimited area. Some or all of the placed and configured video monitoring devices can be logically linked together to form scenes, areas within the delimited area which are monitored by a specified group of physical monitoring devices. The video feed from the physical video monitoring devices may be recorded in stable storage. A layout for display of the video feeds on a computer monitor or other visual display device may be selected. Upon playing the video feed, whether live or recorded, a subject can be tracked through the delimited area by successively selecting one of the video monitoring devices in one of the available scenes.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4a-c are examples of arrangements of video displays in accordance with aspects of the subject matter disclosed herein.

DETAILED DESCRIPTION

Figure 1:
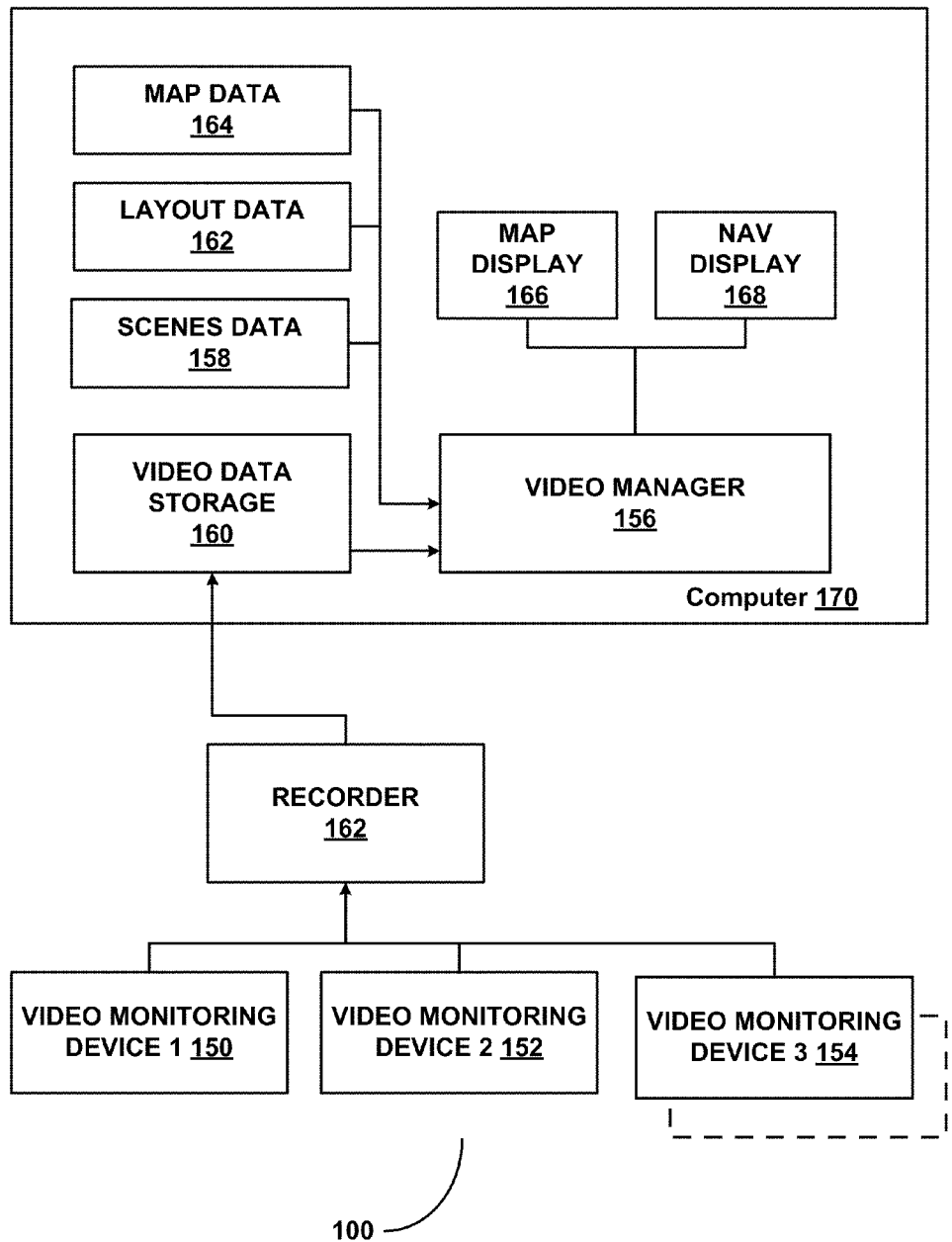
FIG. 1 is a block diagram that illustrates a system for tracking a subject using video monitoring devices logically linked together in accordance with aspects of the subject matter disclosed herein.

FIG. 1 is a block diagram of a system for tracking an entity using video monitoring devices logically linked or connected together to form scenes. System 100 may reside in part on a computer 170. Computer 170 may be a computer such as the one described below with respect to FIG. 5. System 100 may include one or more of the following components: two or more video monitoring devices, 150, 152, 154, etc., a recorder 162, a storage unit or device 160 for storing video data, a scenes data store 158, a layout data store 162, a map data store 164, a video manager 156, a map display 166 and a navigation display 168.

Video monitoring devices such as video monitoring device 1 150, video monitoring device 2 152, video monitoring device 3 154, etc. may be cameras, camcorders, video cameras, fixed or pan, tilt and zoom cameras, closed circuit television cameras, analog or digital cameras, or any type of camera known or developed in the future. Video monitoring devices such as video monitoring device 1 150, video monitoring device 2 152, video monitoring device 3 154, etc. may be analog or digital devices. The video feed captured by the video monitoring devices may be collected by recorder 162. If the data captured by the video monitoring devices is analog data, the data may be converted from analog to digital form by recorder 162. Recorder 162 may provide the data captured by video monitoring devices such as video monitoring device 1 150, video monitoring device 2 152, video monitoring device 3 154, etc. to computer 170 for storage in video data store 160.

Map data 164 may be a representation of a delimited area in which the physical video monitoring devices are deployed and in which an entity or subject may be tracked. A representation (e.g. an icon) of one or more of the plurality of physical video monitoring devices can be placed and configured on the map in accordance with aspects of the subject matter disclosed herein. The delimited area represented by the map may be inside a structure or complex of structures, outside a structure, complex of structure or may include no structures. The delimited area may include both the interior of a structure or complex and regions exterior to the structure or complex of structures. The structure or complex may be public such as an airport, museum, library, school, college or university or private such as a residence or privately owned company. The structure or complex may be a restricted governmental facility or may be any type of delimited area conceivable. The map may be displayed on a computer monitor (e.g., map display 166).

Scenes data store 158 may store scene data. A scene may represent a group of physical video monitoring devices for which representations of which have been placed and configured on the map and which have been logically connected in a relationship called a scene to enable an entity or subject such as a person or an object to be tracked in the delimited area. One video monitoring device of each scene group may be selected to be the main video monitoring device and one or more video monitoring devices may be selected to be linked to the main video monitoring device. One or more groups of linked video monitoring devices or scenes may be defined. Each group of linked video monitoring devices or scene has one main video monitoring device and any number of video monitoring devices linked to the main video monitoring device. Any particular video monitoring device may be the main video monitoring device in one scene and may simultaneously be a linked video monitoring device in one or more other scenes. Similarly a linked video monitoring device in one scene may be a main video monitoring device in a different scene, however in accordance with some aspects of the subject matter disclosed herein, any particular linked video monitoring device may not be both a main video monitoring device and a linked video monitoring device in the same scene.

Selecting the main video monitoring device and the linked video monitoring devices for a scene can be done by using the scene dialog described below. The video monitoring devices may be placed in a location physically in the delimited area and logically in a place representing the physical location on the map representing the delimited area. Within a scene dialog, one of the video monitoring devices deployed in the physical delimited area and logically in a place representing the physical location on the map representing the delimited area may be selected to be the main video monitoring device for a particular scene.

Video monitoring devices located in an area adjacent to the location of the main video monitoring device may be selected to be linked to the main video monitoring device. Selection of video monitoring devices to be linked to the main video monitoring device may be made in such a way that an entity or subject to be tracked moving through a portion of the delimited area will be captured on one video monitoring device and upon exiting from the range of view of the first video monitoring device may enter an area in the range of view of another video monitoring device. By placing video monitoring devices within the delimited area so that available pathways are within the view of one or another of the video monitoring device and by selecting the video monitoring device that displays the subject or entity being tracked to be the main video monitoring device, the entity or subject can be tracked throughout the delimited area. It will be appreciated that as a plurality of scenes can be defined, upon leaving the portion of the delimited area encompassed in the first scene, the subject may be picked up by video monitoring devices in a second scene and so on.

Layout data store 162 stores data specifying the arrangement of video displays displayed in a navigation display (e.g., navigation display 168) on a computer monitor. The navigation display 168 may display all the video data captured by all the video monitoring devices of a scene. The data captured by the main video monitoring device may be displayed initially in the central portion of the display and may be larger in size, with the data captured by the linked video monitoring devices arranged around it in smaller sizes in a grid-like fashion. The type of arrangement and the sizes of the displayed video may depend on the number of video monitoring devices in the scene.

Map data from map data store 164, layout data from layout data store 162, scenes data from scenes data store 158 and video data from video data storage 160 may be provided to video manager 156 which then provides the map display 166 and a navigation display 168, accepts user input and provides output in accordance with the received user input.

Figures 2A, 2B:
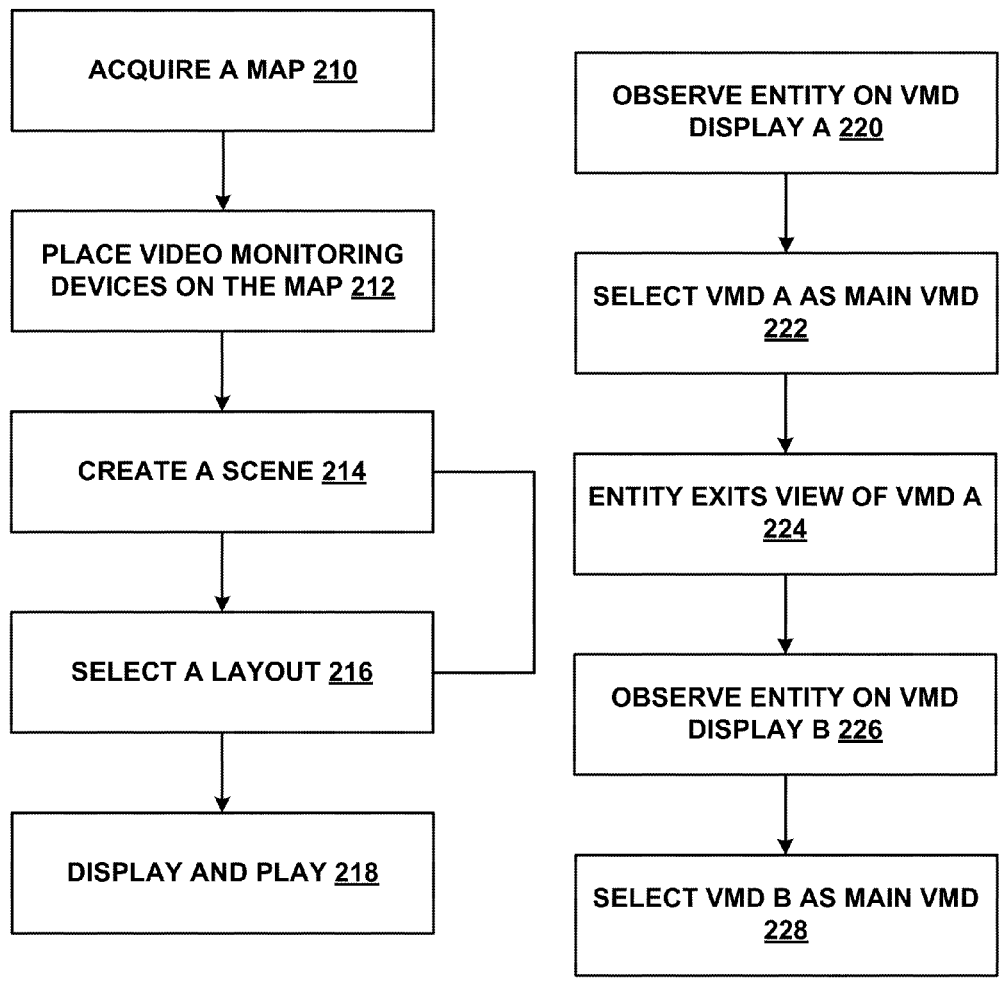
FIG. 2a illustrates an example of a method of tracking a subject using video monitoring devices logically linked together in accordance with aspects of the subject matter disclosed herein.
FIG. 2b illustrates an example of a method for tracking an entity or subject through a delimited area by successive selection of video monitoring devices in accordance with aspects of the subject matter disclosed herein.

FIG. 2*a* illustrates a method of tracking an entity using linked video monitoring devices. Any number of physical video monitoring devices may be deployed within a delimited area. At 210 a map representing the delimited area may be acquired. At 212 representations (e.g. icons) representing some or all of the physical video monitoring devices may be placed and configured on the map. At 214 relationships between the placed and configured video monitoring devices may be specified, linking the video monitoring devices together, creating a scene. At 216 a layout for the navigation display may be selected. 214 and 216 may be repeated to create any number of scenes and layouts. Alternatively, at 212 only the icons representing a particular scene may be added to the map and thus 212, 214 and 216 may be repeated to create the next scene. At 218 the map and navigation displays may be displayed and the video feed from a selected scene may be played. By selecting scenes to play, one after another, a subject can be tracked through the delimited area. Within each scene, a particular video monitoring device may be selected to occupy the central space of the grid.

A map of a delimited area may be acquired (210) by selecting a map from a collection of provided maps, downloading the map from a network, copying the map from CD or DVD, scanning the map into a computer file or may be received using any means. A server IP may be selected, if required, and a map identified on the selected server. Once a map has been acquired, a map setup window may be displayed the first time the application is run and thereafter whenever a map setup function is selected.

FIG. 2*b* illustrates an example of tracking an entity or subject through a delimited area in accordance with aspects of the subject matter disclosed herein. At 220 suppose an entity or subject appears in a first video monitoring device, called VMD A. As the entity moves through the delimited area, the entity may disappear from the area within the view range of VMD A. By selecting VMD A to be the main video monitoring device (222), the displays of the video monitoring devices linked to VMD A may be displayed surrounding the display of VMD A as described more fully below. As the entity disappears from view of VMD A (224), the entity may appear on one of the video monitoring devices linked to VMD A (226), called VMD B in this example. By selecting VMD B as the main video monitoring device at 228, the displays of the video monitoring devices linked to VMD B will be displayed surrounding the display of VMD B. By successive selection of the video monitoring devices to be the main video monitoring device, the entity or subject can be tracked throughout the delimited area.

A scene layout of one scene may change gradually into a scene layout of a next scene, so that a user is less likely to become disoriented. Displays of video feeds from video monitoring devices in the previous scene but not in the current scene may fade out and/or shrink in size and eventually disappear. Video feeds from video monitoring devices in the current scene may fade in and/or gradually increase in size. For example, suppose in a first displayed scene, camera one is the main camera and cameras two and three are linked to camera one. The video feed from camera one may be displayed in an enlarged central portion of the navigation display. The video feed from cameras two may be displayed in areas adjacent to the central portion of the navigation display.

Suppose further that in a second scene camera two is the main camera and cameras one, four, five and six are linked to camera two. Suppose a subject to be tracked enters the field of view of camera one. Suppose the subject disappears from the field of view of camera one and moves into the field of view of camera two. A user may select camera two to be the main camera, for example, by clicking on the display from camera two. In response, the video feed display of camera one in the central portion of the navigation display may shrink or reduce in size and move from the central position in the navigation display to a position adjacent to the central position. The video feed display of camera two may enlarge and move into the central portion of the navigation display formerly occupied by the video feed from camera one. The video feed display of camera three may reduce in size and/or fade and disappear. The video feed displays of cameras four, five and six may fade in, and/or increase in size to occupy the positions selected for them in the scene layout setup screen for scene two.

Figure 3A:
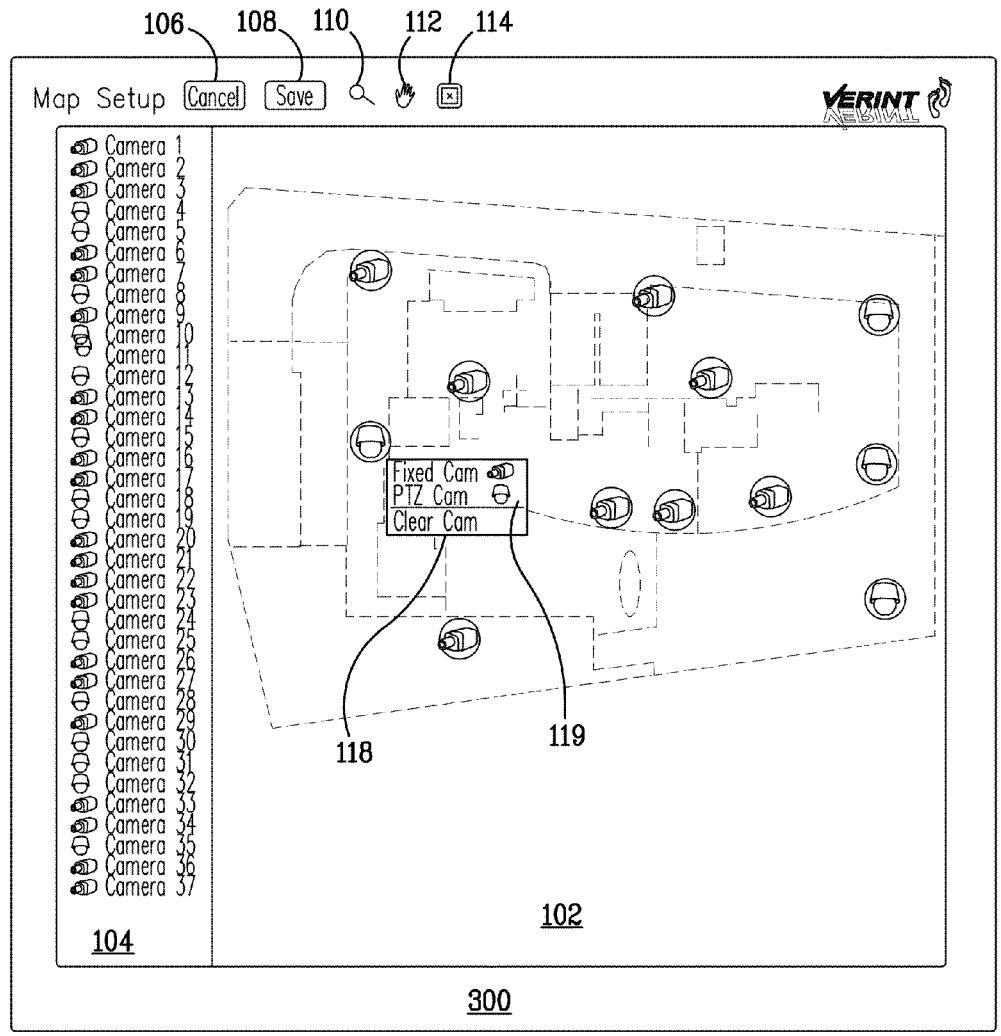
FIGS. 3a-b illustrate displays depicting examples of a delimited area in which a plurality of linked video monitoring devices can be placed and configured in accordance with aspects of the subject matter disclosed herein.

FIG. 3a illustrates an example of a setup window for an acquired map of a delimited area. A number of icons representing physical video monitoring devices deployed in the delimited area can be placed and configured on the map in accordance with aspects of the subject matter disclosed herein. The delimited area represented on the map is a predetermined area and may be inside a structure or complex of structures, outside a structure, complex of structure or may include no structures. The delimited area may include both the interior of a structure or complex and regions exterior to the structure or complex of structures. The structure or complex may be public such as an airport, museum, library, school, college or university or private such as a residence or privately owned company, restricted governmental facility or may be any type of delimited area conceivable.

Within the delimited area, as represented by map 102 of FIG. 3a, any number of video monitoring devices such as camcorders, closed circuit television or any other type of image or video recording devices may be deployed. In FIG. 3a, for example, cameras 1 through 37 (in list 104) are available for placement. In accordance with aspects of the subject matter disclosed herein, a map setup window, an example of which is illustrated by map setup window 300 in FIG. 3a, enables the placement of one or more of the icons representing available video monitoring devices on the map 102 of the delimited area. A video monitoring device can be placed on the map (212) using the map setup window by dragging an icon representing a video monitoring device from the list (e.g., list 104) to a selected location on the map 102. An icon may be placed on the map to correspond with the physical location of that device in the delimited area.

An icon representing a video monitoring device may be cleared from the map using a particular sequence of actions such as, for example, by right-clicking on the icon and selecting an option 118 to clear the video monitoring device from the map. In accordance with aspects of the subject matter disclosed herein, in some embodiments, clearing the video monitoring device from the map does not remove the video monitoring device from the list 104.

The map setup window 300 may also be used to specify the type of video monitoring device deployed. One type of video monitoring device may appear by default. By inputting a particular combination or series of keystrokes the default type may be changed. Alternatively, a type of video monitoring device may be selected from a list, or otherwise selected using well-known techniques. For example, a fixed camera icon may appear by default and by right-clicking on the fixed camera icon and selecting an option from a list, such as list 119 of FIG. 3a, the type of the camera may be changed to a pan, tilt and zoom (PTZ) camera or the reverse.

If a mouse-over operation is performed, a tool tip may appear above the indicated icon which displays the name of the video monitoring device. Other map functionalities may include one or more of the following:

a zoom in/out tool 110 (e.g., a magnifying glass) for zooming the map. When the map is zoomed beyond the capacity of the window, scroll bars may appear.

a hand tool 112 for moving around the map (by dragging) when it is not fully seen in the window.

A default size tool 114 for returning the map to the default size, centered in the window.

In accordance with some aspects of the subject matter disclosed herein, when the map setup window is used initially, if the cancel button 106 is pressed, an error message may indicate through a popup that the map has not been defined, and confirmation that the application should be exited may be requested. If the confirmation is received, the application may close. If no map arrangement is defined, a defined default map arrangement may be used. When at least one video monitoring device has been placed on the map, a button enabling the map to be saved (button 108) may appear or become activated. When all the desired video monitoring devices have been placed and configured, the map is ready to be saved. After the save operation has been performed, a navigation application window may appear. After the initial map setup, placement and configuration of the video monitoring devices can be changed by entering map setup mode again.

Figure 3B:
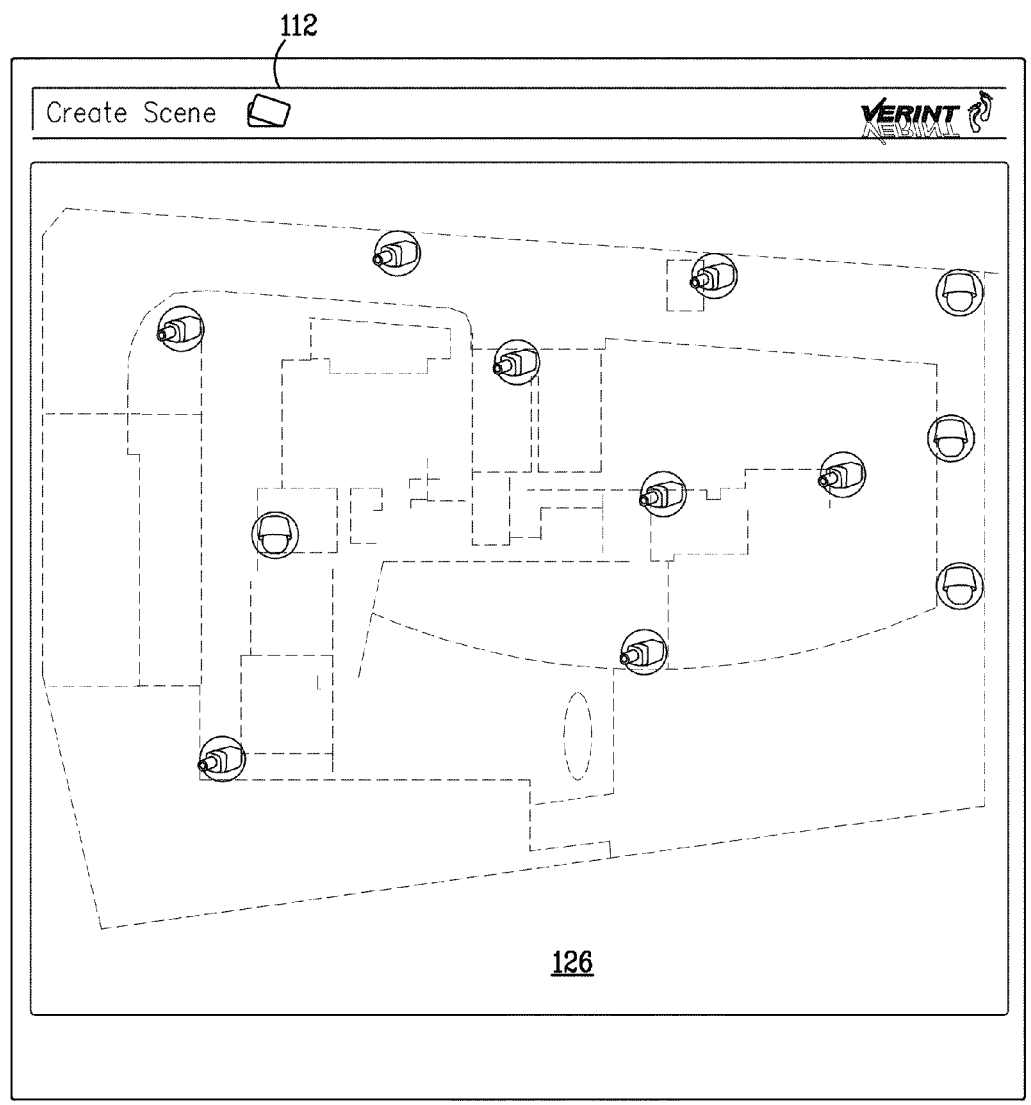
Figure 3C:
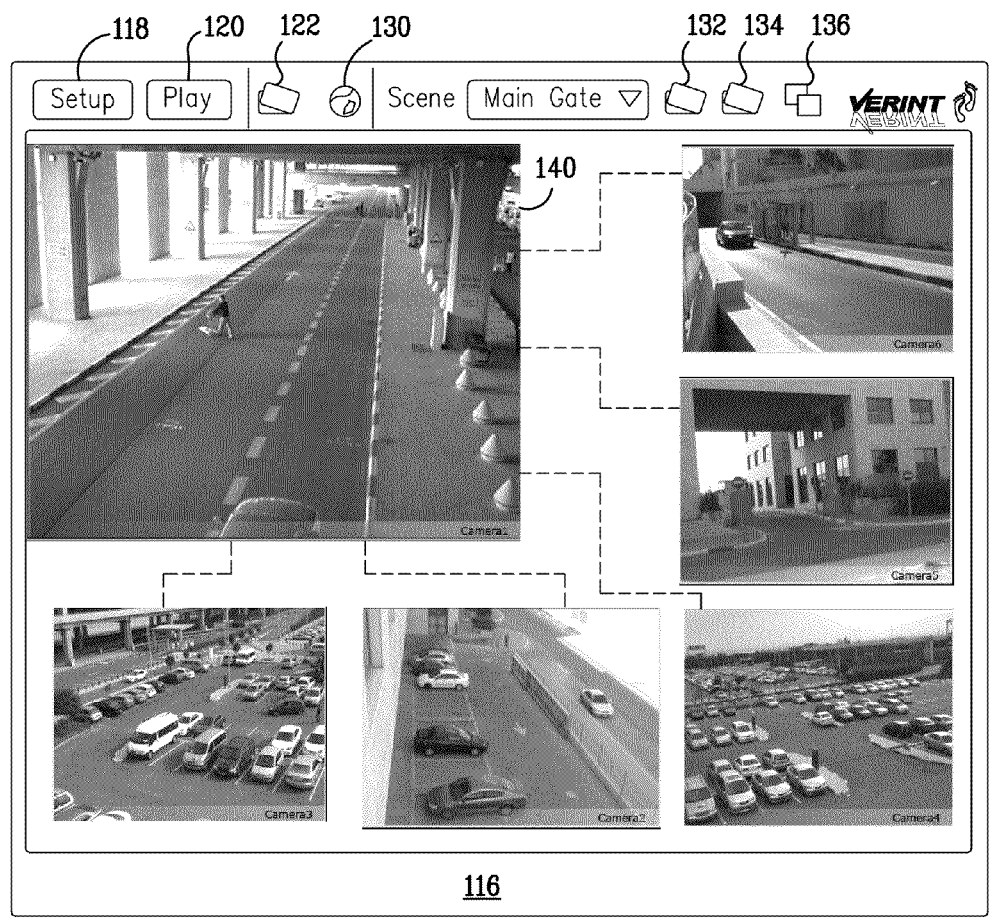
FIGS. 3c-d illustrate displays depicting examples of navigation windows in accordance with aspects of the subject matter disclosed herein.
Figure 3D:
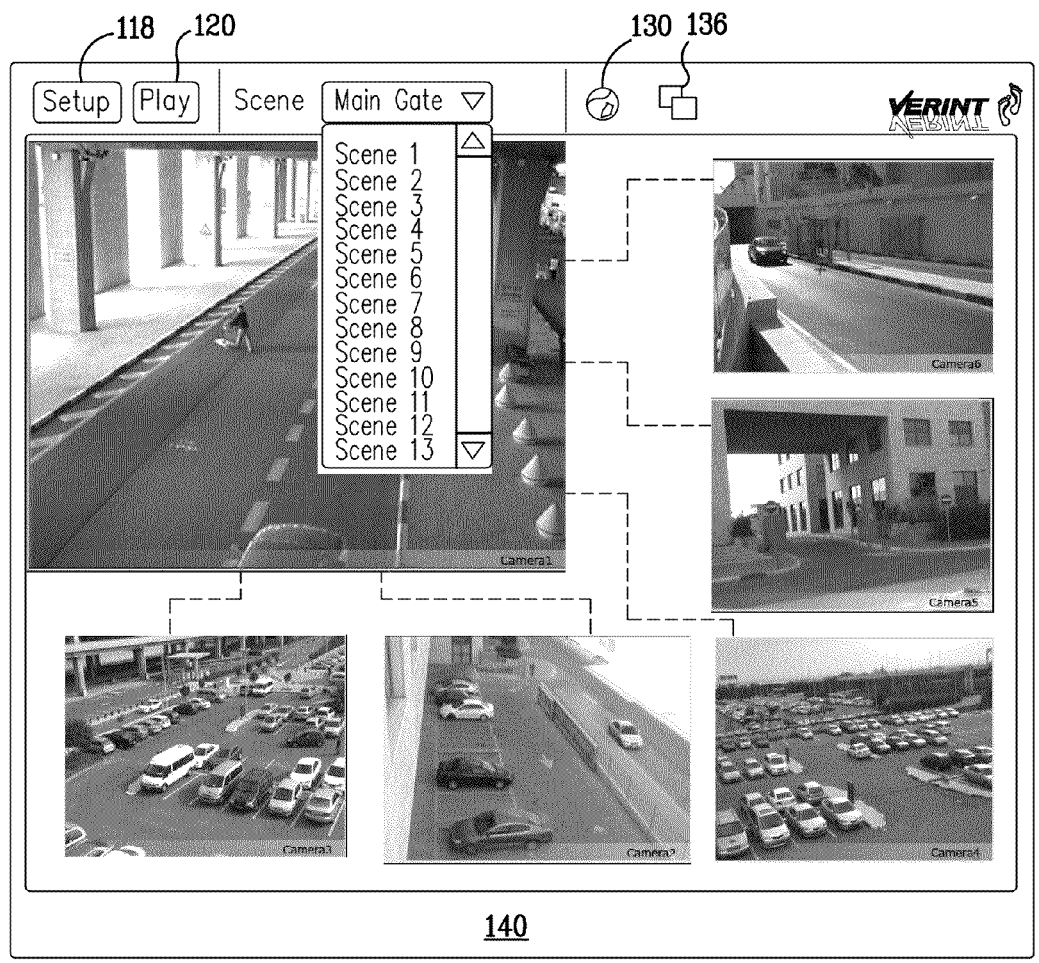

The first time the application is run, after the map is set up and saved, the navigation window may appear, opening in setup mode. An example of a navigation window 116 is illustrated in FIG. 3c. After the first time the application is run, the navigation window may appear as it was last saved. Setup mode may be used to create scenes, a grouping of several video monitoring devices between which relationships are defined.

Figure 3E:
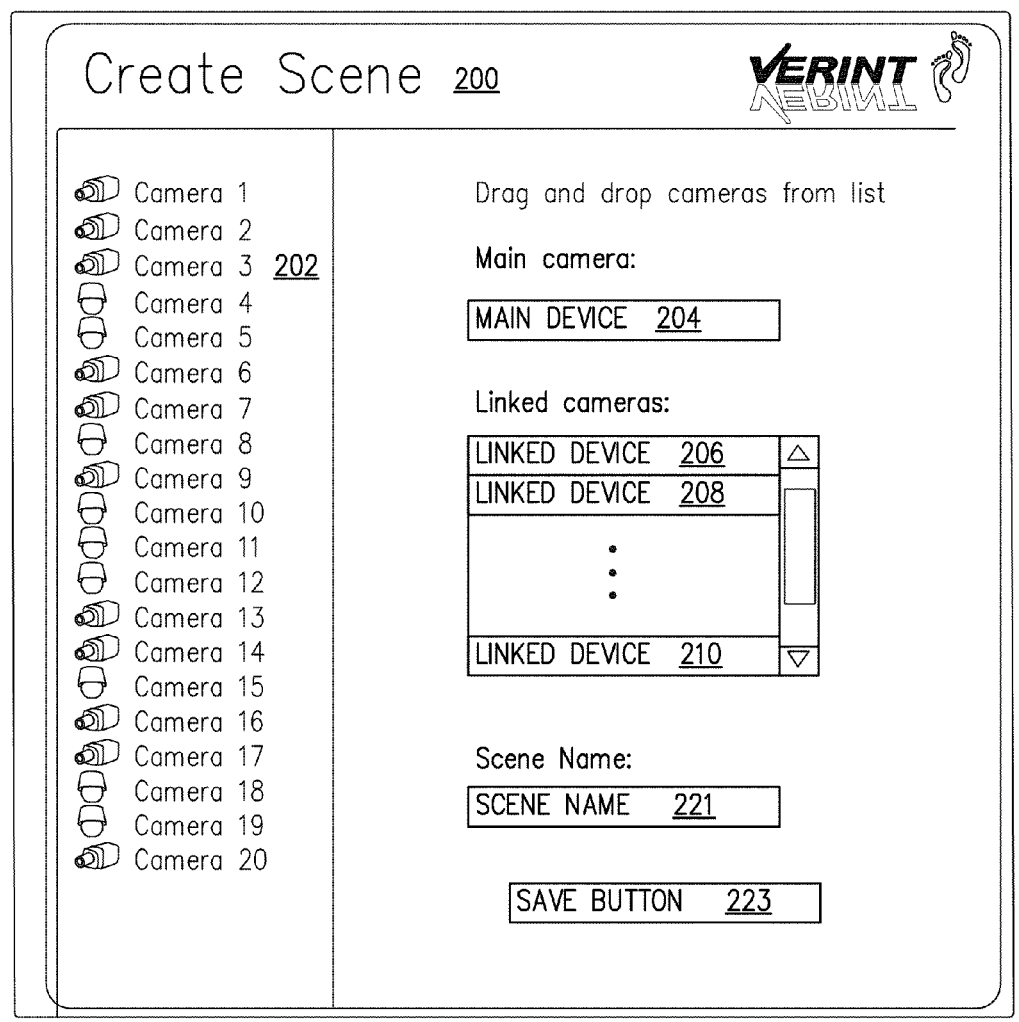
FIG. 3e is a display depicting an example of a dialog for setting up a scene in accordance with aspects of the subject matter disclosed herein.

The first time the application is run, after the map is set up and saved, the map window may automatically switch to create scene mode. A scene may be created (214) by selecting a "new scene" icon 122 on the navigation window 116 or on the map window 126 of FIG. 3b. When the new scene icon 122 is selected on either window, a create scene window with no information may appear. Alternatively, a group of icons representing video monitoring devices may be selected from the map. By subsequently selecting the create scene icon 122, a create scene window may open with all the selected video monitoring devices displayed within a list of video monitoring devices. A group of video monitoring devices may be selected from the map either by group selection (drawing a rectangle around a group of video monitoring devices) or by ctrl-clicking several video monitoring devices. Selected video monitoring devices may change color or become brighter or become larger or may be emphasized in some way on the map to indicate their selection. When the video monitoring devices are selected, and the create scene icon 122 is selected, a create scene window may be opened with the selected video monitoring devices displayed within. An example of a create scene window is illustrated in FIG. 3e. The create scene window 200 of FIG. 3e illustrates a list 202 of video monitoring devices comprising cameras 1 through 20.

The create scene window (e.g., create scene window 200) may include a list (e.g., list 202) of all video monitoring devices in the system. One video monitoring device may be selected to be the "main video monitoring device" 204 and one or more video monitoring devices may be selected to be linked to the main video monitoring device 206, 208, etc. . . . 210. Selecting the main video monitoring device and the linked video monitoring devices can be done by using the "in" and "out" arrows, by dragging or by other well-known methods.

In accordance with some aspects of the subject matter disclosed herein, a video monitoring device may not be able to appear more than once in the create scene window. In this case, once the device has been moved from the full video monitoring device list to either the main video monitoring device or to one of the linked video monitoring devices, it disappears from the full list and vice versa. A video monitoring device may not be able to appear as both the main video monitoring device and as one of the linked video monitoring device. The scene name may automatically take its name from the main video monitoring device, but this default name may be able to be subsequently changed by editing the name appearing as scene name 221. The Save button 223 may be disabled until there is one video monitoring device selected to be the main video monitoring device and at least one video monitoring device selected to be linked to the main video monitoring device. Once saved, the create scene window may close and the saved scene may be added to the scenes menu in the main navigation window, and may be automatically displayed for layout.

Figures 4A, 4B:
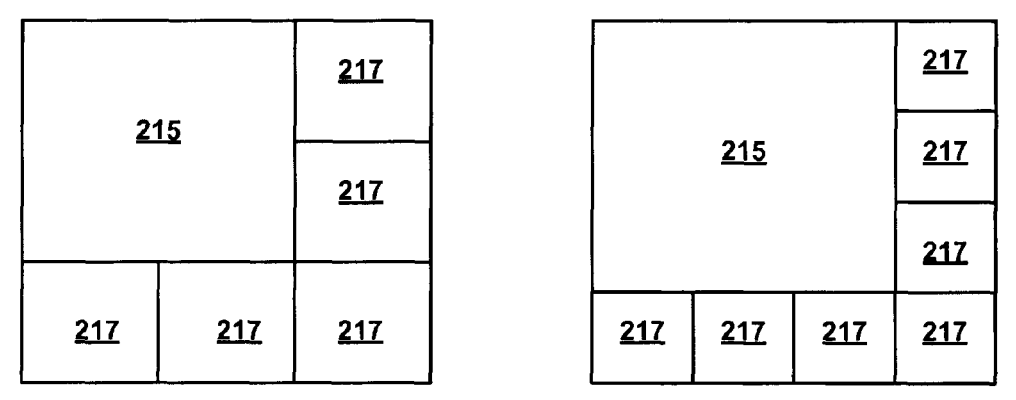

After one or more groups of linked video monitoring devices have been selected and saved, a scene can be laid out (216) using video displays, such as the video displays illustrated in FIGS. 4a, 4b and 4c. The video feed from the main video monitoring device selected may be shown as the largest size display, display 215, with the video feed from the linked video monitoring devices arranged around it in smaller sizes, as illustrated in the various Figures as display 217. The type of arrangement and the sizes of the displayed video may be dependent on the number of video monitoring devices in the scene. Arrangements may include a number of displays in which the video monitoring device selected as the main video monitoring device occupies the larger display area. The larger display area may occupy the center of the navigation window 126. FIG. 4a illustrates an example of an arrangement presented when there are 6 video monitoring devices or fewer. FIG. 4b illustrates an example of an arrangement presented when there are 8 video monitoring devices or fewer. FIG. 4c illustrates an example of an arrangement presented when there are 13 video monitoring devices or fewer. One of skill in the art will realize that the arrangements shown are examples not meant to be limiting and particular embodiments may include these and/or other suitable arrangements.

Video monitoring device names may be indicated via a transparent overlay. Each video monitoring device view may have grab handles at one or more of its 4 corners to resize the view. The appearance of the pointer may change to indicate that a grab handle is being hovered over. The views may be able to be moved around by selecting a view and holding and dragging it. The video monitoring device selected for a resize or move operation may be indicated by having a colored bordered around it or by appearing brighter or by other standard means for highlighting an entity.

The connections between linked video monitoring devices may be indicated by a dashed "elastic" line to the main video monitoring device. If the views have common boundaries (as shown in the layout images illustrated in FIGS. 4a-4c) or the boundaries are close to one another, the dashed line indicating physical linkage may not be visible. If the views are moved or resized, the dashed lines may become visible, denoting the logical connection of the video monitoring devices to one another. For example, in FIG. 3c, dashed lines denoting logical connections are visible (e.g., dashed line 140).

Additional functionalities of the Setup window may include one or more of the following:

Show map: if the map window is closed, selecting the "Show Map" icon (e.g., icon 130 in FIG. 3c) will display the map again.

Edit Scene: to add or delete additional video monitoring devices to the scene, an "Edit Scene" icon, (e.g., icon 132 in FIG. 3c) can be selected. This may bring up the create scene window. Additional video monitoring devices may be added by entering a particular sequence of keystrokes in a particular location (e.g., by right clicking on the background and selecting "Edit Scene", or by dragging an unselected video monitoring device from the map to the main video monitoring location in the navigation window). A video monitoring device may be deleted by entering a particular sequence of keystrokes in a particular location (e.g., by right clicking on a video monitoring device icon and selecting a delete option from a displayed list). In accordance with some aspects of the subject matter disclosed herein, a main video monitoring device may not be allowed to be deleted.

Delete Scene: A selected scene may be deleted by selecting a "Delete Scene" icon (e.g., delete scene icon 134). The next scene in the list will then appear. This operation may also be performed by right clicking and selecting a delete option from a list.

Change Background color: A preferred background color can be selected using an on/off Black/White icon (e.g., icon 136) or using a more elaborate color choice palette.

At 218 the scene can be played to track a subject. In accordance with aspects of the subject matter disclosed herein, a scene may be played in a navigation window on a computer monitor. The monitor may also concurrently display the map. When the scene opens, the feed from the main video monitoring device may occupy the large display in the center of the window. By selecting a display from a linked video monitoring device, the selected display may replace the display from the main video monitoring device, assuming the central larger display position. The display from the main video monitoring device may occupy the space in the window previously occupied by the selected linked video monitoring device. By selecting appropriate displays associated with different linked video monitoring devices, a subject can be tracked through the delimited area. As the selected video monitoring device is highlighted on the map concurrently displayed, the next scene to be viewed can be selected by selecting a different video display.

A scene may change to a new scene in a continuous matter. All of the displays for video monitoring devices of a previous and new scene may appear on a display. The layout may progress gradually from the previous scene layout to the new scene layout. Video monitoring devices in the previous scene and not in the new scene may fade out and/or decrease in size, while video monitoring devices in the new scene and not in the previous scene may fade in and/or enlarge in size.

Example of a Suitable Computing Environment

Figure 5:
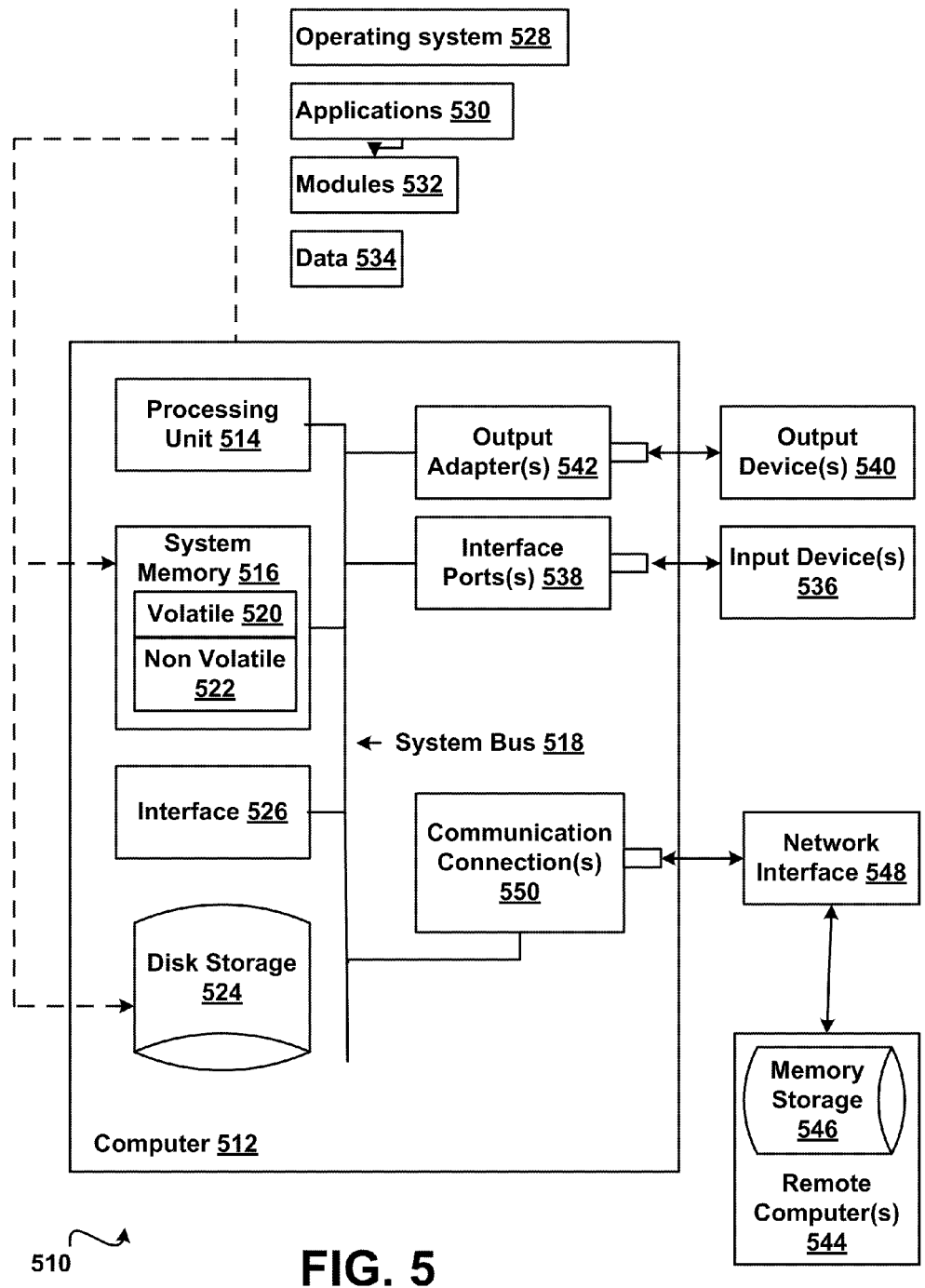
FIG. 5 is a block diagram of an example of a computer on which aspects of the subject matter disclosed herein may be implemented.

In order to provide context for various aspects of the subject matter disclosed herein, FIG. 5 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, components, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 5, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system components including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512. Disk storage 524 may be connected to the system bus 518 through a non-removable memory interface such as interface 526.

It will be appreciated that FIG. 5 describes software that can act as an intermediary between users and computer resources. This software may include an operating system 528 which can be stored on disk storage 524, and which can control and allocate resources of the computer system 512. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 5. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

It should be emphasized that the above-described embodiments of the present disclosure are merely possible examples of implementations, merely set forth for a clear understanding of the principles of the disclosed systems and methods. Many variations and modifications may be made to the above-described embodiment(s) without departing substantially from the disclosed principles of the systems and methods. All such modifications and variations are intended to be included herein within the scope of this disclosure and the present disclosure and protected by the following claims.

The following is claimed:

1. A video monitoring system for tracking an entity through a predetermined area, comprising:
    a map representing the predetermined area, on which a plurality of icons are placed and configured, wherein each icon represents one of at least two video monitoring devices comprising a first video monitoring device and a second video monitoring device, the at least two video monitoring devices deployed in the predetermined area;

an interface configured to receive input specifying generation of a plurality of scenes, wherein generation of a first scene includes receiving input selecting a first icon of the plurality of icons representing a first physical video monitoring device as a main video monitoring device of the first scene and receiving input selecting a second icon representing a second physical video monitoring device of the first scene that is logically linked to the first physical video monitoring device of the first scene;

a video manager configured to generate the first scene and display the map and a navigation display based on the first scene including a first connection indicating the logical link between the first physical video monitoring device of the first scene and the second physical video monitoring device of the first scene; and the interface further configured to accept input from a user to track an entity through the predetermined area wherein the video manager is further configured to generate layout data for the first scene, the layout data identifying an arrangement of displays of video feeds from the at least two video monitoring devices, the arrangement of video feed displays displayed in the navigation display, wherein the navigation display displays video from the at least two video monitoring devices and of the first connection indicating the logical link between the first physical video monitoring device of the first scene and the second physical video monitoring device of the first scene, and wherein the entity is tracked through the predetermined area by successive selection of a display displayed on the navigation display, wherein generation of a second scene includes selecting the second icon representing the second physical video monitoring device as a main physical monitoring device of the second scene and selecting a third icon representing a third physical video monitoring device of the second scene that is logically linked to the second physical video monitoring device of the second scene, wherein the entity is tracked through the predetermined area by successive selections of displays displayed on the navigation display, wherein selecting a display selects a scene to display on the navigation display, wherein the selected scene is a scene in which the selected display displays the main video monitoring device of the scene, and wherein video feed displays of a selected scene are added to the navigation display and video feed displays of a previous scene are removed from the navigation display, and wherein the video manager is configured to display the first connection as a dashed elastic line.

2. The system of claim 1, further comprising, a recorder, the recorder recording configured to record video feed data received from the at least two video monitoring devices to stable storage, 3. A method of tracking an entity through a predetermined area comprising:

acquiring a map representing a predetermined area to be monitored;

placing and configuring icons on the map, the icons representing a plurality of physical video monitoring devices deployed in the predetermined area;

receiving input specifying generation of a plurality of scenes, wherein generation of a first scene includes receiving input selecting a first icon of the plurality of icons representing a first physical video monitoring device as a main video monitoring device of the first scene and receiving input selecting a second icon representing a second physical video monitoring device of the first scene that is logically linked to the first physical video monitoring device of the first scene, and generation of a second scene includes selecting the second icon representing the second physical video monitoring device as a. main physical monitoring device of the second scene and selecting a third icon representing a third physical video monitoring device of the second scene that is logically linked to the second physical video monitoring device of the second scene;

displaying a navigation window representing the first scene on a computer monitor, the navigation window displaying a first video feed from the first physical video monitoring device, a second video feed from the second video monitoring device, and a first connection indicating the logical link between the first physical video monitoring device of the first scene and the second physical video monitoring device of the first scene in a layout specified by the first scene, wherein the first connection indicating the logical link between the first physical video monitoring device of the first scene and the second physical video monitoring device of the first scene is displayed in the navigation window as a dashed elastic line.

4. The method of claim 3, further comprising:

in response to receiving user input selecting the second video feed display on the navigation window, displaying a third video feed from the third video monitoring device on the navigation window in a layout specified for the second scene and removing the first video feed from the navigation window.

5. The method of claim 3, wherein the entity is tracked through the predetermined area by selectively selecting a video feed display on the navigation window in which the entity appears in real time.

6. The method of claim 3, wherein the entity is tracked through the predetermined area by selectively selecting a video feed display on the navigation window in which the entity appears, wherein video feeds from the first video monitoring device, the second video monitoring device and the third video monitoring, device persisted to stable storage are read from the stable storage.

7. The method of claim 4, further comprising enlarging the video feed display from the main physical monitoring device and placing the enlarged, video feed display in a central position of the navigation window.

8. The method of claim 4, further comprising fading in the third video feed display on the navigation window and fading out the first video feed display from the navigation window.

9. A non-transitory computer readable storage medium comprising computer executable program instructions that when executed:

acquire a map representing a predetermined area to be monitored, on which a plurality of icons are placed and configured, wherein each icon represents one of a plurality of physical video monitoring devices deployed in the predetermined area;

accept input from a user, the user input specifying generation of a plurality of scenes, wherein generation of a first scene includes receiving input selecting a first icon of the plurality of icons representing a first physical video monitoring device as a main video monitoring device of the first scene and receiving input selecting a second icon representing a second physical video monitoring device of the first scene that is lo6cally linked to the first physical video monitoring device of the first scene, and generation of a second scene includes selecting the second icon representing the second physical video monitoring device as a main physical monitoring device of the second scene and selecting a third icon representing a third physical video monitoring device of the second scene that is logically linked to the second physical video monitoring device of the second scene;

displaying a navigation window representing the first scene on a computer monitor, the navigation window displaying a first video feed from the first physical video monitoring device, a second video feed from the second video monitoring device, and a first connection indicating the logical link between the first physical video monitoring device of the first scene and the second Physical video monitoring device of the first scene in a layout specified by the first scene, wherein the first connection indicating the logical link between the first physical video monitoring device of the first scene and the second physical video monitoring device of the first scene is displayed in the navigation window as a dashed elastic line.

10. The non-transitory computer readable storage medium of claim 9, comprising further computer executable program instructions that when executed:

in response to the user input further selecting the second video feed display on the navigation window, display a third video feed from the third video monitoring device on the navigation window in a layout specified by the second scene and removing the first video feed from the navigation window.

11. The non-transitory computer readable storage medium of claim 9, wherein the entity is tracked through the predetermined area by selectively selecting a video feed display on the navigation window in which the entity appears in real time.

12. The non-transitory computer readable storage medium of claim 9, wherein the entity is tracked through the predetermined area by selectively selecting a video feed display on the navigation window in which the entity appears, wherein video feeds from the first video monitoring device, the second video monitoring device and the third video monitoring device persisted to stable storage are read from the stable storage.

13. The non-transitory computer readable storage medium of claim 10, comprising further computer executable program instructions that when executed:

enlarge the video feed display from the main physical monitoring device and placing the enlarged video feed display in a central position of the navigation window.

14. The non-transitory computer readable storage medium of claim 10, comprising further computer executable program instructions that when executed:

fade in the third video feed display on the navigation window and fading out the first video feed display from the navigation window.

\* \* \* \* \*